Figure 1:
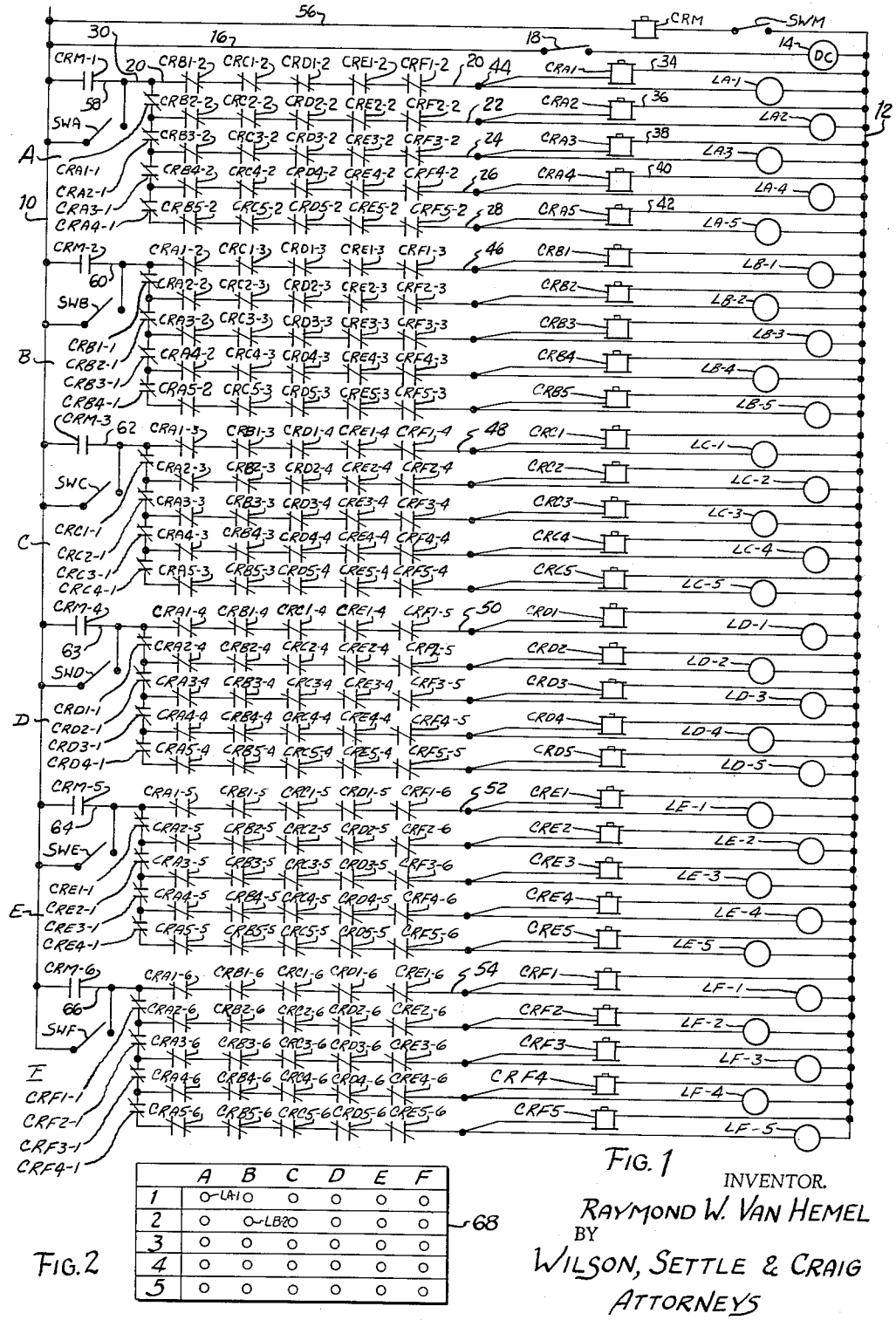

Jan. 21, 1964     R. W. VAN HEMEL     3,118,236

EDUCATIONAL DEVICE

Filed Nov. 15, 1961

INVENTOR.
RAYMOND W. VAN HEMEL
BY
WILSON, SETTLE & CRAIG
ATTORNEYS

United States Patent Office
3,118,236
Patented Jan. 21, 1964

1

3,118,236
EDUCATIONAL DEVICE
Raymond W. Van Hemel, Allen Park, Mich., assignor, by mesne assignments, to Wesley Pearce, Dearborn, Mich.
Filed Nov. 15, 1961, Ser. No. 152,398
5 Claims. (Cl. 35—48)

This invention relates to an educational device for use in competitive quizzes to determine the priority of response of the contestants, and more particularly to a device operated by electrical power and including a plurality of circuits actuated by switch means controlled by the contestants to operate signaling means to indicate the order of switch actuation.

One technique of teaching which has recently been given considerable attention is the conduction of competitive quizzes among pupils. The recognition gained by the pupils in the quizzes acts as an incentive to learn the subject matter at hand. A leading example of this technique is the national system of Bible quizzes. Bible pupils compete in regional contests and winners of the regional contests compete in an annual contest. It has been found that this is an effective way of teaching, primarily because pupils will try harder in such a competitive situation.

The method of conducting such quizzes involves asking a panel of pupils a question. The first pupil to indicate that he has the answer is given the first chance to answer the question. If his answer is correct then he is given a point credit. If his answer is incorrect, the second pupil to rise is given an opportunity to answer the question. This order of priority is continued, with each contestant having an opportunity to answer the question determined by the order of his response.

As may be appreciated, it is difficult to visually determine which contestant was the first to respond. If there are five or six contestants, the response from the contestants may appear to be simultaneous or so closely together in time that the order of response cannot be judged accurately.

The present invention provides a device for accurately determining the order of response of a plurality of contestants by providing each contestant with an electrical switch which is interconnected with a plurality of other switches in a relay circuit. The order of closure of each switch with relationship to the other switches is indicated on a master board and permits the judge or umpire to determine the order of response accurately.

It is therefore an object of the invention to provide an educational device comprising an electrical circuit for indicating the order of actuation of a plurality of switches.

Another object of the invention is to provide a system in which each contestant is provided with a switching device which he actuates with the assurance that the exact order of his response will be recorded without any question or chance of error upon the part of the judge.

A further object of the invention is to provide a hold-in device which will retain a record of the order of closing the switches even after the switches are again open.

Another object of the invention is to provide a system which may be incorporated in a master board to permit easy reading by one person of the priority of response of a plurality of contestants.

Other objects of this invention will appear in the following description and appended claims, reference being had to the accompanying drawing forming a part of this specification wherein like reference characters designate corresponding parts in the several views.

In the drawing:

FIGURE 1 is a schematic illustration of one embodiment of the electrical circuitry of the present invention; and FIGURE 2 is a front plan view of a master board illustrating one arrangement for recording the order of response.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phaseology or terminology employed herein is for the purpose of description and not of limitation.

Referring to FIGURE 1, it will be seen that the circuit illustrated has six positions A–F. Each position is for the use of one contestant and has a normally closed switch SWA–SWF which may be conveniently mounted in the seat of the chair upon which the contestant sits. The switches for this arrangement are preferably of the spring-actuated type wherein the pressure of the person sitting on the seat will hold the switch in the open position and will return to the normally closed position when the contestant stands up. However, other switching arrangements may be used as desired. For example, a normally open manually depressible switch may be mounted on a table in front of each contestant and actuated by hand pressure of the contestant.

Each position also includes a primary relay circuit which is connected in series with its respective switch. The switch-relay circuits are connected in parallel with respect to each other across power lines 10, 12. Line 16 connects lines 10, 12 to D.C. power 14. A switch 18 is provided in line 16 to open or close the circuit to power. Instead of being operated by D.C. power as shown, the system can also be operated by A.C. power. However, the cost of components for A.C. power is more expensive than for D.C. power and consequently D.C. operation is preferred.

Each relay circuit has the coils of five relays, position A having coils CRA1–CRA5, position B having coils CRB1–CRB5, position C having relay coils CRC1–CRC5, position D having relay coils CRD1–CRD5, position E has relay coils CRE1–CRE5, and position F has relay coils CRF1–CRF5. Each relay has six normally closed contacts, identified as CRA1–1–6–CRF5–1–6.

The circuitry for each position A–F is identical and for the purpose of the present description, the circuitry relating to position A only will be described. It will be appreciated, however, that the same description will also apply to each of the other positions.

Position A has five parallel lines 20–28 arranged in an order of priority to form secondary circuits. Switch SWA is directly connected by line 30 to the first line 20. Line 20 is connected to line 22 through contact CRA1–1 and the coil CRA1 is connected between line 20 and power line 12 by line 34. Line 22 is connected to line 24 through contact CRA2–1 and the coil CRA2 is connected between line 22 and power line 12 by line 36. Line 24 is connected to line 26 through contact CRA3–1 and the coil CRA3 is connected between line 24 and power line 12 by line 38. Line 26 is connected to line 28 through contact CRA4–1 and the coil CRA4 is connected between line 28 and power line 12 by line 40. Finally, coil CRA5 is connected between line 28 and power line 12 by line 42.

Each line 20–28 has connected therein one relay contact of a relay, the coil of which is positioned in the relatively same line or priority of each of the other positions B–F. For example, line 20 has five contacts connected therein before the contact point 44. The first line 46 in position B has relay coil CRB1. Consequently, one of the contacts CRB1–2 is positioned in the first line 20 of position A. The first line 48 of position C has relay coil CRC1 and the contact CRC1–2 is connected in line 20. The first line 50 of position D has relay coil CRD1 and the contact CRD1–2 is connected in line 20. The first line 52 of position E has relay coil CRE1. The contact CRE1–2 is connected in line 20. The first line 54 of position F has relay coil CRF1 and the contact CRF1–2 is connected in line 20. This arrangement is repeated in lines 22–28, each of these lines having one contact of a similarly positioned relay coil from another position connected therein.

In accordance with this arrangement, each relay of position A has a contact connected in the correspondingly same line of each of the other positions. For example, relay coil CRA1 has contact CRA1–2 in line 46 of position B, contact CRA1–3 in line 48 of position C, contact CRA1–4 in line 50 in position D, contact CRA1–5 in line 52 of position E, and contact CRA1–6 in line 54 of position F.

An indicating lamp LA–1–LA–5 is provided in each line 20–28 in parallel with the relay coils CRA1–CRA5. The lamps are placed in parallel with their respective relay coils so that if one of the lamps burns out it will not open the power circuit through its respective relay coil. This arrangement permits the circuit to operate even though one of the lamps is burned out and serves to indicate when a lamp is burned out as will be described in connection with operation of the device. The function of the indicating lamps is to provide a visual signal to a judge or umpire of the order of closing switches SWA–SWF. The lamps may be conveniently located, as shown in FIGURE 2, on a master board 68 and arranged in six columns A–F and five rows 1–5. Each column includes the five lamps of the designated position, the lamps being arranged in the same order as the five lines of each position.

It will be assumed, for the purpose of illustrating the operation of the device, that the contestant seated at position A stands up first. When this contestant stands up, switch SWA will close. Closing of switch SWA will initially result in supplying power to each of the relay coils CRA1–5. Each of the coils will thus be momentarily energized, causing their various contacts to open. However, upon energization of coil CRA1, its contact CRA1–1 will open, thus de-energizing each of the coils CRA2–5. The lamp LA1 will be lit, indicating to the judge that the contestant in position A arose before any of the other contestants.

When the contestants in the remaining positions rise, causing their respective switches SWB–SWF to close, the circuit through the first line 46–54 of each of these positions will not be closed because each of these lines has one contact CRA1–2–CRA1–6 of the energized coil CRA1 and these contacts will now be open thus preventing energization of the coils CRD1–CRF1 and of the lamps LB1–LF1.

Assuming that the contestant at position B arises next, causing switch SWB to close, the relay coils CRB2–CRB5 will be each momentarily energized. As above mentioned, the coil CRB1 will not be energized because of the open contact CRA1–2. Energization of coil CRB2 will cause its contact CRB2–1 to open thus de-energizing each of the three other coils CRB3–CRB5. The lamp LB2 will light, thus indicating to the judge that contestant in position B arose second. Energization of coil CRB2 will cause opening of the contacts CRB2–2–CRB2–6. Thus, no contestant in any of the other positions will be able to light his lamp LC2–LF2.

This process is repeated until all of the contestants have arisen. The last contestant to rise will not light a lamp. The absence of a lighted lamp at his position will indicate to the judge that he arose last.

As previously mentioned, if one of the lamps is burned out, this will be evident to the judge. For example, if the lamp LA1 is burned out, and the contestant at position A arises first, energization of the coil CRA1 will still take place. This will prevent any of the other contestants from lighting lamps LB1–LF1. The judge, upon noting that none of the lamps in the first row have been lit, will be apprised that one of the bulbs in the first row is burned out. He will then merely have to check each of the six bulbs in this row to determine which one is defective.

A hold-in circuit is provided to lock the system in after all of the contestants have stood up. The contestants may thereafter be seated without altering the condition of the master board 68 which has recorded thereon the order of closure of the switches SWA–SWF.

The hold-in circuit comprises a master relay having a coil CRM which is connected between power lines 10, 12 by line 56. A master switch SWM is also provided in line 56 to permit selective energization of coil CRM. The master relay has six normally open contacts CRM–1–CRM–6. Contact CRM–1 is connected in line 58 which is in parallel with switch SWA, contact CRM–2 is connected in line 60 which is in parallel with switch SWB, contact CRM–3 is connected in line 62 which is placed in parallel with switch SWC, contact CRM–4 is connected in line 63 which is placed in parallel with switch SWD, contact CRM–5 is connected in line 64 which is placed in parallel with SWE and contact CRM–6 is connected in line 66 which is placed in parallel with switch SWF.

Closure of switch SWM will cause energization of relay coil CRM and closure of the contacts CRM–1–CRM–6. These contacts, being in parallel with switches SWA–SWF, will thus perform the same function performed by the closed switches. Upon opening of any of the switches, the condition of the circuit as a whole will not be altered because any circuit closed by the switches will remain closed as a result of the closed contacts CRM–1–CRM–6. The judge may then at his leisure inspect the master board and conduct the quiz without danger of losing track of the order of rising of the contestants even though one or more of the contestants may be re-seated. When the question asked has been satisfactorily answered or when each of the contestants has had an opportunity to attempt answering the question, the judge can then ask all of the contestants to be seated which will cause each of the switches SWA–SWF to close. The judge can then open the switch SWM to return the device to its initial condition in preparation for a new question.

Having thus described my invention, I claim:

1. An educational device for determining the priority of response of each contestant in a group of quiz contestants, comprising a plurality of switches, each switch being actuatable by a contestant to indicate that he can answer an asked question; a primary circuit in series with each switch; means to apply electrical power to each switch and associated primary circuit; each primary circuit comprising a plurality of secondary circuits arranged in parallel to form an order of priority with respect to each other; control means in each secondary circuit which, upon actuation thereof, act to prevent actuation of all lower priority secondary circuits of the same primary circuit and act to prevent actuation of any other secondary circuit of the same priority in the other primary circuits; and signaling means in each secondary circuit operative upon actuation thereof to indicate the priority of response of a contestant with respect to the other contestants.

2. An educational device for determining the priority of response of each contestant in a group of quiz contestants, comprising a plurality of normally open switches, each switch being actuatable to close by a contestant to indicate that he can answer an asked question; a primary circuit in series with each switch; means to apply electrical power to each primary circuit upon the closure of its associated switch; each primary circuit comprising a plurality of secondary circuits arranged in parallel to form an order of priority with respect to each other; control means in each secondary circuit which, upon energization thereof, act to prevent energization of all lower priority secondary circuits of the same primary circuit and act to prevent energization of any other secondary circuit of the same priority in the other primary circuits; and signaling means in each secondary circuit operative upon energization thereof to indicate the priority of response of the contestant.

3. An educational device for determining the priority of response of each contestant in a group of quiz contestants, comprising a plurality of normally open switches each being operated to the closed position by a contestant to indicate that he can answer an asked question; a relay circuit in series with each switch; means to apply electrical power to each relay circuit upon the closure of its associated switch; each relay circuit including a plurality of relays having their coils connected in parallel; each relay having a plurality of normally closed contacts; the relay coils of each relay circuit being arranged in an order of priority with respect to each other; a contact of each higher priority relay connected between each lower priority coil of the same relay circuit and the associated switch whereby energization of a higher priority relay coil, with resultant opening of the relay contacts, prevents energization of all lower priority relay coils of the same relay circuit; a contact of each relay being connected in series with each coil of the same priority of the other relay circuits whereby energization of any relay coil will prevent energization of any other coil of the same priority in the other relay circuits; and signaling means associated with each relay coil energized upon energization of the related coil to indicate the priority of response of the contestant.

4. An educational device for determining the priority of response of each contestant in a group of quiz contestants, comprising a plurality of normally open switches each being operated to the closed position by a contestant to indicate that he can answer an asked question; a relay circuit in series with each switch; means to apply electrical power to each relay circuit upon the closure of its associated switch; each relay circuit including a plurality of relays having their coils connected in parallel; each relay having a plurality of normally closed contacts; the relay coils of each relay circuit being arranged in an order of priority with respect to each other; a contact of each higher priority relay connected between each lower priority coil of the same relay circuit and the associated switch whereby energization of a higher priority relay coil, with resultant opening of the relay contacts, prevents energization of all lower priority relay coils of the same relay circuit; a contact of each relay being connected in series with each coil of the same priority of the other relay circuits whereby energization of any relay coil will prevent energization of any other coil of the same priority in the other relay circuits; signaling means associated with each relay coil energized upon energization of the related coil to indicate the priority of response of the contestant; a master relay having a plurality of normally open contacts; each of the contacts of the master relay being connected in parallel with one of the normally open switches; and means to apply electrical power to the coil of the master relay to cause energization thereof with resultant closing of its contacts to close a second circuit through each of the relay circuits to thereby hold said circuits in any given condition thereof caused by the closing of said switches.

5. An educational device for determining the priority of response of each contestant in a group of quiz contestants, comprising a plurality of normally open switches each being operated to the closed position by a contestant to indicate that he can answer an asked question; a relay circuit in series with each switch; means to apply electrical power to each relay circuit upon the closure of its associated switch; each relay circuit including a plurality of relays having their coils connected in parallel; each relay having a plurality of normally closed contacts; the relay coils of each relay circuit being arranged in an order of priority with respect to each other; a contact of each higher priority relay connected between each lower priority coil of the same relay circuit and the associated switch whereby energization of a higher priority relay coil, with resultant opening of the relay contacts, prevents energization of all lower priority relay coils of the same relay circuit; a contact of each relay being connected in series with each coil of the same priority of the other relay circuits whereby energization of any relay coil will prevent energization of any other coil of the same priority in the other relay circuits; and a signaling lamp connected in parallel with each relay coil for energization along with energization of the related coil to thereby indicate the priority of response of the contestant.

References Cited in the file of this patent
UNITED STATES PATENTS

| 2,562,179 | Dorf | July 31, 1951 |
| 2,654,163 | Reynolds | Oct. 6, 1953 |
| 2,793,446 | Childs | May 28, 1957 |